Nov. 18, 1969  G. DÖRFLER  3,479,506
APPARATUS FOR A LINEAR ANALYSIS OF SURFACES OF A STRUCTURALLY
HETEROGENEOUS SUBSTANCE COMPRISING PHASES GIVING DIFFERENT
RESPONSES TO THE INCIDENCE OF AN ELECTRON BEAM
Filed July 6, 1966

INVENTOR:
Gerhard Dörfler
BY:
Arthur O. Klein
ATTORNEY

United States Patent Office 3,479,506
Patented Nov. 18, 1969

3,479,506
APPARATUS FOR A LINEAR ANALYSIS OF SURFACES OF A STRUCTURALLY HETEROGENEOUS SUBSTANCE COMPRISING PHASES GIVING DIFFERENT RESPONSES TO THE INCIDENCE OF AN ELECTRON BEAM
Gerhard Dörfler, Kapfenberg, Austria, assignor to Gebr. Bohler & Co. Aktiengesellschaft, Vienna, Austria
Filed July 6, 1966, Ser. No. 563,191
Claims priority, application Austria, July 14, 1965,
A 6,449/65
Int. Cl. H01j 37/26
U.S. Cl. 250—49.5            1 Claim

ABSTRACT OF THE DISCLOSURE

An apparatus and a method for linear analysis of surfaces of a structurally hetereogeneous substance, such as a metal having different phases which give different responses to the incidence of an electron beam. The apparatus includes a micro-analyzer which is adapted to scan a surface area of the heterogeneous substance along a straight line at a known uniform velocity with an electron beam generated by the apparatus. Due to the reflection of the incident electron beam voltages are generated in the apparatus which can be derived from any desired property of the phase in the scanned surface of the heterogenous substance. These generated voltages are passed through analyzing means which comprise a discriminator which is adapted to select a preselected voltage, the latter being characteristic of the phase to be analyzed. The selected voltage range after having passed through the discriminator opens a gate. A pulse-emitting oscillator is connected in parallel to the gate and transmits pulses of constant frequency thereto via an electronic switch. The latter transmits these pulses as long as the electron beam incides on the phase to be measured, so that the ratio of the number of transmitted pulses to the total number of pulses which would be generated during analysis if the gate were permanently open, indicates the proportion of the phase to be measured in the scanned surface.

---

When it is desired to prepare equilibrium diagrams and in numerous other metallographic investigations, it is highly important that reliable data are obtained on the quantitative proportions of various phases in the sample. Such proportions are now ascertained by means of an integrating stage microscope, by radiographical methods, planimetric analysis of a photomicrography or, more recently, by measurement with the light spot microscope.

Except for the radiological methods, all these methods rely on the differential reflectivity of the various phases. With metallic samples, it is always necessary to etch or vapor-coat the surface to be examined in order to increase the contrast. In many cases, only the grain boundaries can be etched so that considerable errors in measurement may occur by a formation of reliefs and a projection of shadows. Most optical methods have also the disadvantage that the results of measurement depend on subjective observations.

Radiographic methods give sufficiently accurate results only if the phase to be measured is fairly homogeneous.

The present invention teaches a method of linear analysis on surfaces of structurally heterogeneous, metallic or non-metallic substances, which method can be adapted in a simple manner to conduct a surface analysis and which is not affected by subjective errors. Even the disturbing influence of any phase inhomogeneities may be eliminated within certain limits. If the analyzing means of the equipment are used which is required for an electron beam micro-analysis, inexpensive and space-saving attachments, which are very simple in structure, may be used in carrying out the method according to the invention.

An attachment to an electron beam microanalyzer has been disclosed for an examination of inclusions in metallic samples, which attachment comprises essentially a computer and a few gates. This auxiliary device is unhandy and intolerable in size and cost, particularly for a laboratory for routine work. Besides, said known auxiliary device is suitable only for an investigation of inclusions, not for a determination of linear and surface proportions of different phases, in which the same elements are contained in different concentrations.

The method according to the invention relies on the very fact that, e.g., two different phases of an alloy contain the alloying elements in different concentrations, provided that the concentration is constant in one and the same phase, in an ideal case, or varies only by insignificant amounts, as is usually the case in practice.

The invention provides a method of linear analysis of surfaces of structurally heterogeneous metallic or non-metallic substances with the aid of an electron beam micro-analyzer and the invention is characterized in that the area to be analyzed is scanned along a straight line at a known, uniform velocity with an electron beam, voltages are generated which are derived from any desired property of the phase to be investigated and with the aid of analyzing means of the microanalyzer, by means of a discriminator a voltage range is selected from among said voltages which is particularly characteristic of the phase to be analyzed, and said voltage range is utilized to open a gate, an oscillator is connected in parallel to said gate and operated at a known, constant frequency, so as to emit pulses of constant frequency, and an electronic switch transmits said pulses as long as the electron beam is on the phase to be measured, so that the ratio of the number of said pulses, which may be counted with a counter, to the total number of pulses which would be generated during the analysis if the gate were permanently open, indicates the proportion of the phase to be measured.

The characteristic property of the phase to be measured may be, e.g., the counting-rate meter voltage. It may be particularly desirable to utilize the absorbed or diffusely reflected electron current which depends in its value on the mean atomic number at the point of incidence of the electron beam.

It is also possible to sort by means of an electronic device the pulse trains which result from the scanning with the electron beam, which sorting is in accordance with the pulse count of each train, and to register said trains in group counters.

Another method of utilizing the result of the analysis is to use the pulse train occurring at the output of the gate for a representation of the phase distribution by scanning so that the phase distribution is displayed on an oscillograph screen.

If the method according to the invention is to be used for a surface analysis of the sample surfaces to be examined, this may be accomplished if the scanning motion of the electron beam is controlled by means known per se for scanning a surface.

If the counting-rate meter voltage is used as a typical property of the phase to be detected, the X-rays which emerge from the sample upon which the electron beam impinges, are utilized for carrying out the method according to the invention. In this case, the analysis must be carried out during a relatively long time unless the accuracy of measurement is adversely affected by the fact that the residence time of the electron beam on each surface element is too short. This influence may be particularly undesirable when carrying out surface analyses.

The same disadvantages will be obtained if any other utilizable property of the phase to be investigated, e.g., the absorbed or the diffusely reflected electron current, is used rather than the counting-rate meter voltage, and only a mechanical scanning device is available the microanalyzer which is employed. For the analysis of an area of 300 x 300 microns, the analysis time which is required is in the range of 20–60 minutes. If electronic scanning may be employed and the absorbed or diffusely reflected electron current is relied upon, the same area may be analyzed within only 7–10 seconds.

The novel features which are considered characteristic for the invention are set forth in particular in the appended claims. The invention itself, however, both as to its construction and its method of operation, together with additional objects and advantages thereof, will be best understood from the following description when read in connection with the accompanying drawing in which:

Figure 4:
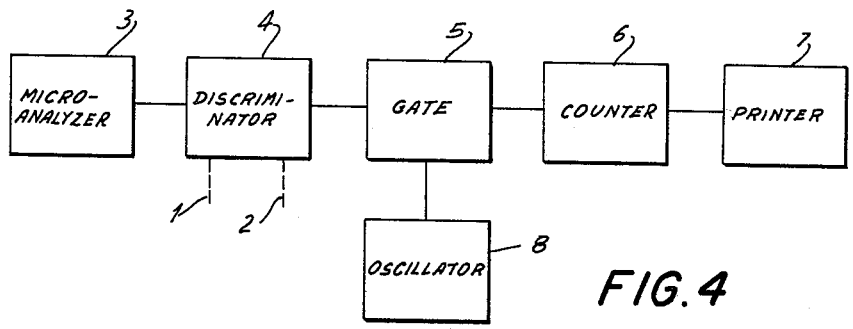
FIG. 4 is a block diagram of an arrangement for carrying out the method of this invention.

FIG. 4 of the drawing is a block diagram of an arrangement for carrying out the method according to the invention. This ararngement comprises the series-connected units which will be listed hereinafter: A voltage generator consisting of an analyzing device of the electron beam microanalyzer 3, a discriminator unit 4 having a lower threshold 1 and an upper threshold 2, a gate 5, a frequency-constant oscillator 8, which is connected in parallel to the gate 5, a counter 6 and a printer 7.

Figure 1:
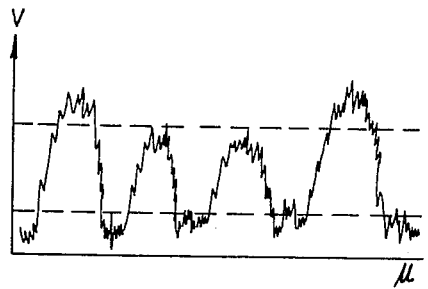
FIG. 1 is a diagram illustrating the voltage variations during scanning time.
Figure 2:
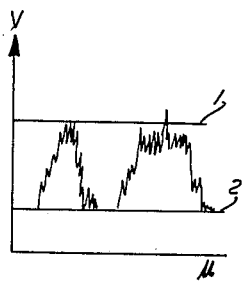
FIG. 2 is a diagram illustrating the upper and lower thresholds between which a voltage range can be selected.
Figure 3:
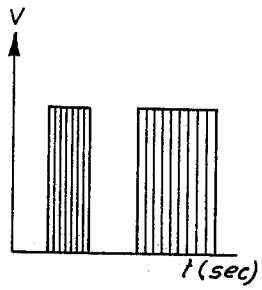
FIG. 3 is a diagram illustrating the number of emitted pulse per unit of time.

To carry out the method according to the invention, the sample to be examined is scanned in the microanalyzer by the electron beam along a straight line of known length and at a constant velocity, which is known too. The X-rays emitted by the sample may be utilized, e.g., to produce a usual record by scanning. This possibility is not utilized according to the invention where the output voltage V of the counting-rate meter is applied to a logic circuit. This voltage is proportional to the counting rate. The voltage variations during the scanning time may be recorded by a recorder and give a recorded diagram such as is shown by FIG. 1 of the drawing. The voltage, which varies along the scanned line, must pass through a discriminator unit, which has upper and lower thresholds, so that voltages which are between two selected limits may be selected. These limits are represented in FIG. 2 by voltages 1 and 2. The voltage range between thresholds 1 and 2 is selected so that it is characteristic of the phase to be detected. In the selected arrangement, the discriminator unit will produce an output voltage of the counting-rate meter is within the selected range. Higher and lower voltages will be suppressed so that only the voltages stated in FIG. 2 will be available. These voltages occur only when the electron beam is incident on a phase which gives a response within the selected voltage range and are utilized for controlling, e.g., a switching transistor. An oscillator is connected in parallel to said transistor to apply to the same a voltage pulse train at a known, constant repetition rate. The pulses from this oscillator, e.g., at a constant repetition rate of 50 pulses per second, will be transmitted by the transistor only when the selected voltage range is applied. In this gate, the X-ray pulses emitted by the sample are utilized only for a control. The number of pulses which is used in the result of measurement is constant per unit of time, as is apparent from FIG. 3. These pulses are registered by a counter, which is suitably combined with a printer. For an evaluation of the result of measurement, the total number of pulses transmitted during the analysis may be used and may be compared with the known possible number of pulses, which would have been obtained during the analysis if the gate had been permanently opened. This enables a determination of the proportion of the phase to be measured.

If the scanning of the surface of the sample with the electron beam is controlled by a scanning device, known per se, the method according to the invention may be utilized for analyzing a surface.

This may be exemplified by an experiment carried out on a sample of a ferritic-austenitic steel containing 25% chromium, 4% nickel and 1% silicon. This steel was a two-phase alloy containing approximately equal proportions of ferrite and austenite. Nickel was used as an indicating element for carrying out the surface analysis because the difference in concentration of nickel between these two phases is relatively large. The discriminator unit was adjusted so that the proportion of the area of the austenitic phase having a relatively higher nickel content must be measured.

The scanned area was 300 x 300 microns. The following data were obtained:
Length of one line—300 microns
Number of lines—100 (300)
Scanning time per line—12 seconds
Duration of analysis—20 minutes (100 lines); 60 minutes (300 lines)
Pulses per line (12×50)—600
Pulses per micron—2
Total number of pulses when the gate is permanently open—60,000 (100 lines); 180,000 (300 lines)
Total number of pulses when discriminator is set to the counting-rate meter voltage range which is representative of nickel in austenite—29,893 (100 lines); 89,661 (300 lines)

These values indicate that the proportion of austenite in the scanned area is about 49.6% which is well in agreement with the expected result.

If the electron beam microanalyzer which is available comprises two or more separate measuring stations so that two or more elements can be detected at the same time, the accuracy of the analysis carried out with the method according to the invention may be increased because two or more elements contained in the phase to be detected may be used as indicating elements in this case.

In this case, the analysis is carried out with an AND-gate (or NAN-gate) arranged before the above-mentioned gate and transmitting voltage (or blocking such voltage) only when voltages within selected limits occur simultaneously in two or more parallel voltage channels.

Figure 5:
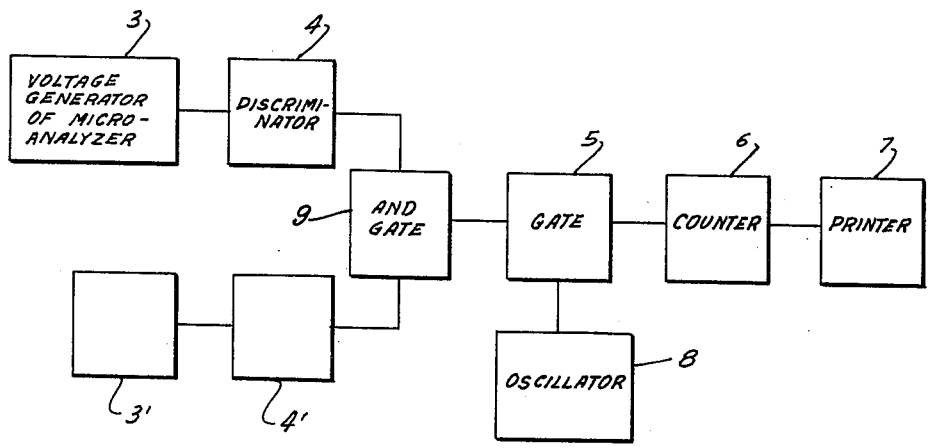
FIG. 5 is a block diagram of another arrangement for carrying out the method of this invention with which the concentrations of two different elements may be detected.

FIG. 5 of the drawing is a block diagram representing an arrangement which may be used for carrying out this process. This arrangement comprises two separate voltage channels. Each of said channels comprises a voltage generator 3, 3' of the microanalyzer and at least one discriminator 4, 4'. The two voltage channels are connected by an AN-gate 9 to the following series-connected units: A gate 5, a constant-frequency oscillator 8 connected in parallel to said gate, a counter 6 and a printer 7.

This method and the apparatus set forth for carrying out the method enable, e.g., the detection of phases from among a multiplicity of other phases, provided that the detected phase contains at least two elements within predetermined concentration ranges. This will substantially increase the safety that only the desired phase is counted.

This method may be used, e.g., to ascertain specific sulfides in alloy steels, where the concentration of sulfur and one indicating element in a preselected concentration are used as parameters. For instance, pure manganese sulfides as distinct from iron-manganese sulfides and various oxides may be detected without difficulty.

What is claimed is:

1. A method of determining the relative proportions of a plurality of metallic phases on the surface of an alloy wherein the different phases are defined by different concentrations of the same metals, which comprises the steps of:

linearly scanning an electron beam over the surface at constant speed to cause the emission, from each phase in the path of the scan and during the interval of incidence of the beam thereon, of X-rays having a common frequency and an intensity within a unique range determined by the composition of the specified phase;

continually converting the intensity of the emitted X-rays to a proportional control voltage indicative of the concentration of the metal of the phases;

opening a normally closed electric gate during each interval that the control voltage amplitude is indicative of an emitted X-ray intensity within one of the ranges defined by the predetermined phases, each of the separate intervals representing a separate phase on the surface;

passing a continuous sequence of pulses of constant repetition rate through the gate each time the latter is opened;

counting the number of pulses passed by the gate during each of its opened intervals; and comparing the number of pulses passed by the gate during each of the opened intervals with the number of pulses that would be counted if the gate remained opened during an entire scan to determine the proportion of the total scanned area represented by the corresponding phase.

References Cited

UNITED STATES PATENTS

| | | |
|---|---|---|
| 3,193,679 | 7/1965 | Melford et al. |
| 3,260,845 | 7/1966 | Duncumb. |
| 3,340,395 | 9/1967 | Webb. |

RALPH G. NILSON, Primary Examiner

A. L. BIRCH, Assistant Examiner

U.S. Cl. X.R.

250—83.3